(12) United States Patent
Shanton (10) Patent No.: US 7,651,032 B2
(45) Date of Patent: Jan. 26, 2010

(54) METHODS AND SYSTEMS FOR IN-LINE RFID TRANSPONDER ASSEMBLY

(75) Inventor: Kenneth Shanton, West Chicago, IL (US)

(73) Assignee: Smurfit-Stone Container Enterprises, Inc., Chicago, IL (US)

( * ) Notice: Subject to any disclaimer, the term of this patent is extended or adjusted under 35 U.S.C. 154(b) by 325 days.

(21) Appl. No.: 11/158,704

(22) Filed: Jun. 22, 2005

(65) Prior Publication Data

US 2006/0290513 A1    Dec. 28, 2006

(51) Int. Cl.
G06K 19/06    (2006.01)
(52) U.S. Cl. .................. 235/491; 235/492; 156/205
(58) Field of Classification Search ............ 235/472.02, 235/491, 492; 35/472.02
See application file for complete search history.

(56) References Cited

U.S. PATENT DOCUMENTS

| | | | |
|---|---|---|---|
| 5,566,441 A * | 10/1996 | Marsh et al. ................. | 29/600 |
| 6,107,920 A | 8/2000 | Eberhardt et al. | |
| 6,206,292 B1 | 3/2001 | Robertz et al. | |
| 6,215,401 B1 | 4/2001 | Brady et al. | |
| 6,259,369 B1 * | 7/2001 | Monico ................. | 340/572.8 |
| 6,259,408 B1 * | 7/2001 | Brady et al. .......... | 343/700 MS |
| 6,476,775 B1 * | 11/2002 | Oberle ................ | 343/895 |
| 6,667,092 B1 * | 12/2003 | Brollier et al. ........... | 428/182 |
| 6,940,408 B2 * | 9/2005 | Ferguson et al. ......... | 340/572.7 |
| 2002/0167405 A1 | 11/2002 | Shanks et al. | |
| 2003/0136503 A1 * | 7/2003 | Green et al. ................ | 156/264 |
| 2004/0070504 A1 * | 4/2004 | Brollier et al. ........... | 340/572.8 |
| 2004/0078957 A1 | 4/2004 | Forster et al. | |
| 2004/0135691 A1 * | 7/2004 | Duron et al. ............. | 340/572.7 |
| 2005/0035924 A1 * | 2/2005 | Liu et al. ................... | 343/895 |
| 2005/0068182 A1 | 3/2005 | Dunlap et al. | |
| 2005/0241506 A1 * | 11/2005 | Walther ................. | 101/232 |

* cited by examiner

*Primary Examiner*—Michael G Lee
*Assistant Examiner*—Kristy A Haupt
(74) *Attorney, Agent, or Firm*—Armstrong Teasdale LLP (57) ABSTRACT

Methods and apparatus for manufacturing a radio frequency identification (RFID) enabled corrugated paperboard are provided. The apparatus includes a corrugated paperboard feed device configured to supply a quantity of corrugated paperboard, an antenna attach device configured to couple an antenna to the corrugated paperboard, a curing device configured to provide curing energy to the antenna to at least one of dry the antenna and facilitate optimizing an electrical conductivity of the antenna, and an attach mechanism configured to couple a radio frequency identification circuit to the antenna.

22 Claims, 7 Drawing Sheets

METHODS AND SYSTEMS FOR IN-LINE RFID TRANSPONDER ASSEMBLY

BACKGROUND OF THE INVENTION

This invention relates generally to wireless communication systems and, more particularly, to container structures that incorporate radio frequency identification (RFID) components.

At least some known RFID systems include a transponder, an antenna, and a transceiver with a decoder, or a reader. The transponder typically includes a radio frequency integrated circuit, and an antenna positioned on a substrate, such as an inlet or tag. The antenna receives RF energy from the reader wirelessly and transmits the data encoded in the received RF energy to the radio frequency integrated circuit.

RF transponder "readers" utilize an antenna as well as a transceiver and decoder. When a transponder passes through an electromagnetic zone of a reader, the transponder is activated by the signal from the antenna. The reader decodes the data on the transponder and this decoded information is forwarded to a host computer for processing. Readers or interrogators can be fixed or handheld devices, depending on the particular application.

Several different types of transponders are utilized in RFID systems, including passive, semi-passive, and active transponders. Each type of transponder may be read only or read/write capable. Passive transponders obtain operating power from the radio frequency signal of the reader that interrogates the transponder. Semi-passive and active transponders are powered by a battery, which generally results in a greater read range. Semi-passive transponders may operate on a timer and periodically transmit information to the reader. Transponders may also be activated when they are read or interrogated by a reader. Transponders may control their output, which allows them to activate or deactivate apparatus remotely. Active transponders can initiate communication, whereas passive and semi-passive transponders are activated only when they are read by another device first. Active transponders can supply instructions to a machine and then the machine may then report its performance to the transponder. Multiple transponders may be located in a radio frequency field and read individually or simultaneously. Sensors may be coupled to the transponders to sense an environmental condition.

Transponders typically are attached to an article, such as a corrugated box or a folding carton, in the form of a smart label or tag that includes a radio frequency integrated circuit, an antenna, and a backing substrate, usually polyester or paper, together with a release layer. The assembled label may then be attached to the article by means of a pressure-sensitive adhesive that is incorporated into the label. However, such a process is not cost-effective for the mass application of RFID transponders to a large quantity of articles in a global supply chain.

BRIEF DESCRIPTION OF THE INVENTION

In one embodiment, an apparatus for manufacturing corrugated paperboard includes a corrugated paperboard feed device configured to supply a quantity of corrugated paperboard, an antenna attach device configured to couple an antenna to the corrugated paperboard, a curing device configured to provide curing energy to the antenna to at least one of dry the antenna and facilitate optimizing an electrical conductivity of the antenna, and an attach mechanism configured to couple a radio frequency identification circuit to the antenna.

In another embodiment, an assembly line for manufacturing radio frequency identification enabled corrugated paperboard includes a supply of corrugated paperboard, a press configured to couple a plurality of antennae to a first planar surface of the supply of corrugated paperboard, the antenna including a connection area and at least one receiving area, a curer configured to provide curing energy to the antenna, a sensor configured to locate a connection area of each of the plurality of antennae, and an attach mechanism configured to couple a radio frequency identification circuit to each connection area.

In yet another embodiment, a method of forming a radio frequency identification (RFID) enabled corrugated paperboard includes providing a quantity of corrugated paperboard, coupling a plurality of antennae to a surface of the corrugated paperboard, the plurality of antennae each including a connection area and at least one receiving area, curing the plurality of antennae using at least one of heat and radiation, optically locating the connection area of each of the antennae; and coupling a radio frequency identification circuit to each antenna connection area such that radio frequency energy received by the antenna is transmitted to the radio frequency identification circuit.

DETAILED DESCRIPTION OF THE INVENTION

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

Figure 1:
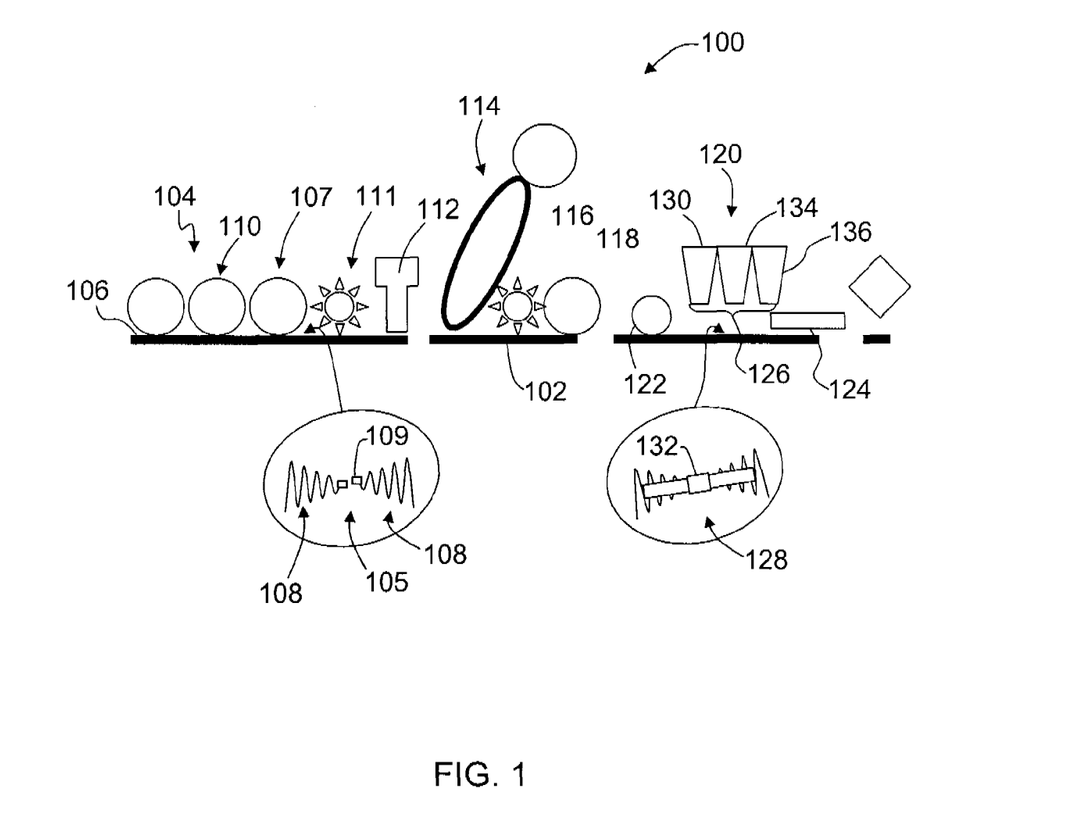
FIG. 1 is a schematic view of an exemplary assembly line for fabricating a quantity of radio frequency identification (RFID) enabled corrugated paperboard.

FIG. 1 is a schematic view of an exemplary assembly line 100 for fabricating a quantity of radio frequency identification (RFID) enabled corrugated paperboard 102. In an exemplary embodiment, corrugated paperboard 102 is cut into discrete blanks. The blanks are of uniform size or are of various sizes. Corrugated paperboard 102 is fed from a roll (not shown) in the case of continuous media and is fed from a stack (not shown) of blanks in the case of discrete blanks.

A graphics print section 104 is used to print graphics on a surface 106 of corrugated paperboard 102. An antenna application section 107 is used to couple an RFID antenna 105 to each blank or at spaced locations along continuous corrugated board 102. Antenna application section 107 includes an applicator for a pressure release antenna or an applicator for a thermal transfer process. Antenna application section 107 also includes a print press application configured to print antennae 105 to corrugated paperboard 106 using, for example, a lithographic process, a flexographic process, a rotogravure process, a rotary screen print process, a drop-on-demand ink jet process, a continuous ink jet process, a spray process, and/or a pad printing process. Alternatively, the antenna may be coupled to the linerboard by hot or cold embossing of a metallic foil, such as aluminum or copper or other metal composites. In the exemplary embodiment, antenna 105 is printed using a conductive ink, such as an ink that includes a metallic and/or conducting polymeric component. In the exemplary embodiment, the ink is Parmod® VLT Ink SSA-400 commercially available from Parelec of Rocky Hill, N.J. 08553. Antenna 105 is printed under or over graphics printed on corrugated paperboard 106 or is printed in conjunction with other print processes that print graphics on corrugated paperboard 106.

In another embodiment, antenna 105 is printed using or in conjunction with a pattern printing process wherein a selective application of a design is printed to the substrate, for example, corrugated paperboard 106. Antenna 105 is printed onto the pattern printed on the substrate. Pattern printing permits relatively more accurate printing of antenna 105 than printing directly to corrugated paperboard 106 because the pattern substantially prevents bleeding of the conductive ink used to print antenna 105 onto areas of corrugated paperboard 106 adjacent antenna 105. Printing over a patterned primer substantially limits bleeding of the conductive ink in X, Y, and Z directions wherein X is a first lateral direction across the face of corrugated paperboard 106, Y is a second lateral direction across the face of corrugated paperboard 106 perpendicular to the first direction, and Z is a direction into corrugated paperboard 106. The pattern may be configured in a shape substantially matching the shape of antenna 105 or may be configured in any shape such that at least a portion of antenna 105 overlaps the pattern. In the exemplary embodiment, the primer is a styrene-acrylic based varnish. In an alternative embodiment, the primer comprises a polymeric material.

Heat and/or radiation is added to corrugated paperboard 106 at any point to dry and/or cure the ink. In various embodiments, an over print varnish is applied to antenna 105 using a windowed applicator such that connection area 109 remains uncovered.

In one embodiment, the location of the application of antennae 105 is indexed based on index marks affixed to surface 106 or by an indexing method that uses fixed distances between machine points to affix antennae 105 in a determinable location on surface 106. Antenna 105 includes one or more reception areas 108 and one or more connection areas 109. A single reception area 108 includes a predetermined pattern of conductive material extending from a first side of connection area 108 and a second side of connection area 108. An embossing device 110 is used to create a depression in corrugated paperboard 106 proximate a location where connection area 109 will be positioned. Alternatively, an embossed depression is formed with the raw linerboard stock or is formed as part of the process of printing antenna 105.

A curer 111 is used to cure the antennae. A particular ink used to form the antennae may require a specific procedure for curing the antennae to optimize the conductive properties of the antennae and/or the stability of the antenna structure. In various embodiments, curer 111 is used to cure an adhesive used to affix the antennae to corrugated paperboard 102 when a pressure release process is used. Curer 111 includes a radiative energy source, for example, an infrared source, or an ultraviolet source and includes a heat source for curing the antennae and/or adhesive.

A registration mechanism 112 is used for locating the antennae such that a strap attach device 114 applies an RFID strap (not shown in FIG. 1) to a predetermined location on a connection area of each antennae. Registration mechanism 112 includes an optical device, for example an electric eye or video camera that detects each connection area prior to the connection area passing strap attach device 114.

A second curer 116 is used to cure an adhesive used to couple each strap to corrugated paperboard 106. A particular adhesive used to couple the strap to the antenna and corrugated paperboard 106 the may require a specific procedure for curing the adhesive to optimize the adhesive properties of the adhesive. Curer 110 includes a radiative energy source, for example, an infrared source, or an ultraviolet source and includes a heat source for curing the adhesive.

Over-print varnish is applied to corrugated paperboard 106 after the transfer of the antenna image to corrugated paperboard 106 using a varnish roller 118 and/or a web transfer cylinder.

In the exemplary embodiment, assembly line includes a folder/gluer section 120 that includes a glue applicator 122, a folder 124, and an RFID test section 126. In an alternative embodiment, RFID test section 126 is a section separate from folder/gluer section 120. RFID test section 126 includes an encoder 130 configured to communicate with the RFID transponder assembly 128 to program a predetermined serial number into a memory of a radio frequency identification circuit 130 coupled to RFID transponder assembly 128. An RFID tester 134 is used to send a "read" signal to radio frequency identification circuit 130, initialize radio frequency identification circuit 130, and verify radio frequency identification circuit 130 transmits the serial number programmed into the memory in response to a read signal. If radio frequency identification circuit 130 does not respond properly to the "read" corrugated paperboard a marker 136 indicates on the radio frequency identification assembly 128 that radio frequency identification circuit 130 did not encode or respond properly. Corrugated paperboard 102 with a marked radio frequency identification assembly 128 is removed from the assembly line to try to re-encode radio frequency identification circuit 130 or discard corrugated paperboard 102 with the non-functional radio frequency identification circuit 130.

Figure 2:
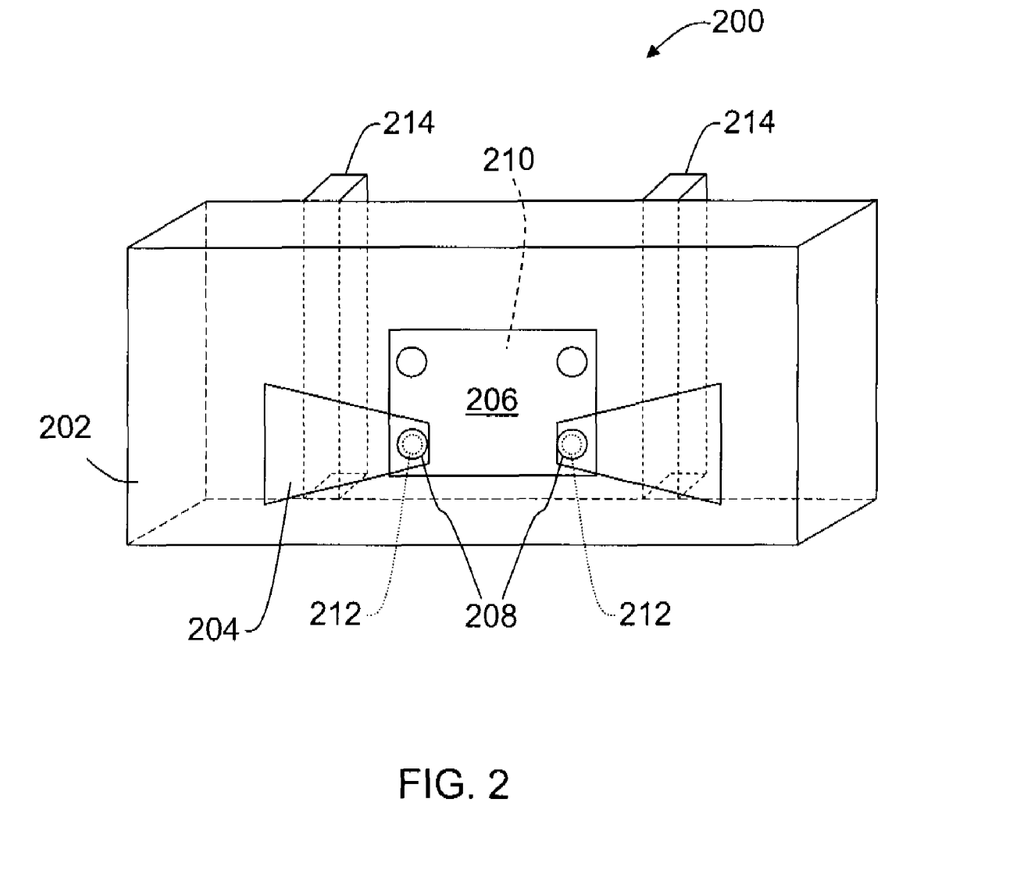
FIG. 2 is a schematic view of an exemplary RF enabled strap that may be used with the corrugated paperboard and antennae shown in FIG. 1.

FIG. 2 is a schematic view of an exemplary RF enabled strap 200 that may be used with corrugated paperboard 102 and antenna 105 (shown in FIG. 1). In the exemplary embodiment, strap 200 includes a substrate 202, an electrically conductive pad 204 that is printed on substrate 202 using a conductive ink. A radio frequency identification circuit 206 is electrically coupled to pad 204 through one or more bumps 208 extending away from a surface 210 of radio frequency identification circuit 206. Radio frequency identification circuit 206 is coupled to substrate 202 using an adhesive 212, such as a conductive or anisotropic epoxy or other adhesive material. An adhesive 214 is applied to assembled strap 200 to facilitate coupling strap 200 to antenna 114.

In the exemplary embodiment, radio frequency identification circuit 206 is a passive circuit. In various alternative embodiments, radio frequency identification circuit 206 is a semi-passive or active circuit that includes a battery (not shown) or capacitive storage device coupled to radio frequency identification circuit 206. In various embodiments, a sensor (not shown) is electrically coupled to radio frequency identification circuit 206 for communicating environmental data proximate the sensor. The sensor is of micro-mechanical design such that the sensor is incorporated into radio frequency identification circuit 206 or is a separate device that is communicatively coupled to radio frequency identification circuit 206. The sensor is used to read environmental or other conditions in the vicinity of the sensor, for example, but not limited to, vibration, shock, temperature, pressure, and humidity. A plurality of sensors are coupled to each radio frequency identification circuit 206. In one embodiment, the sensors are configured to read and transmit a signal corresponding to the environmental conditions when signaled by an RF reader. In various alternative embodiments, the sensors include a battery which permits the sensor to read and record the environmental conditions and transmit the recorded data when requested or interrogated by an RF reader.

Figure 3:
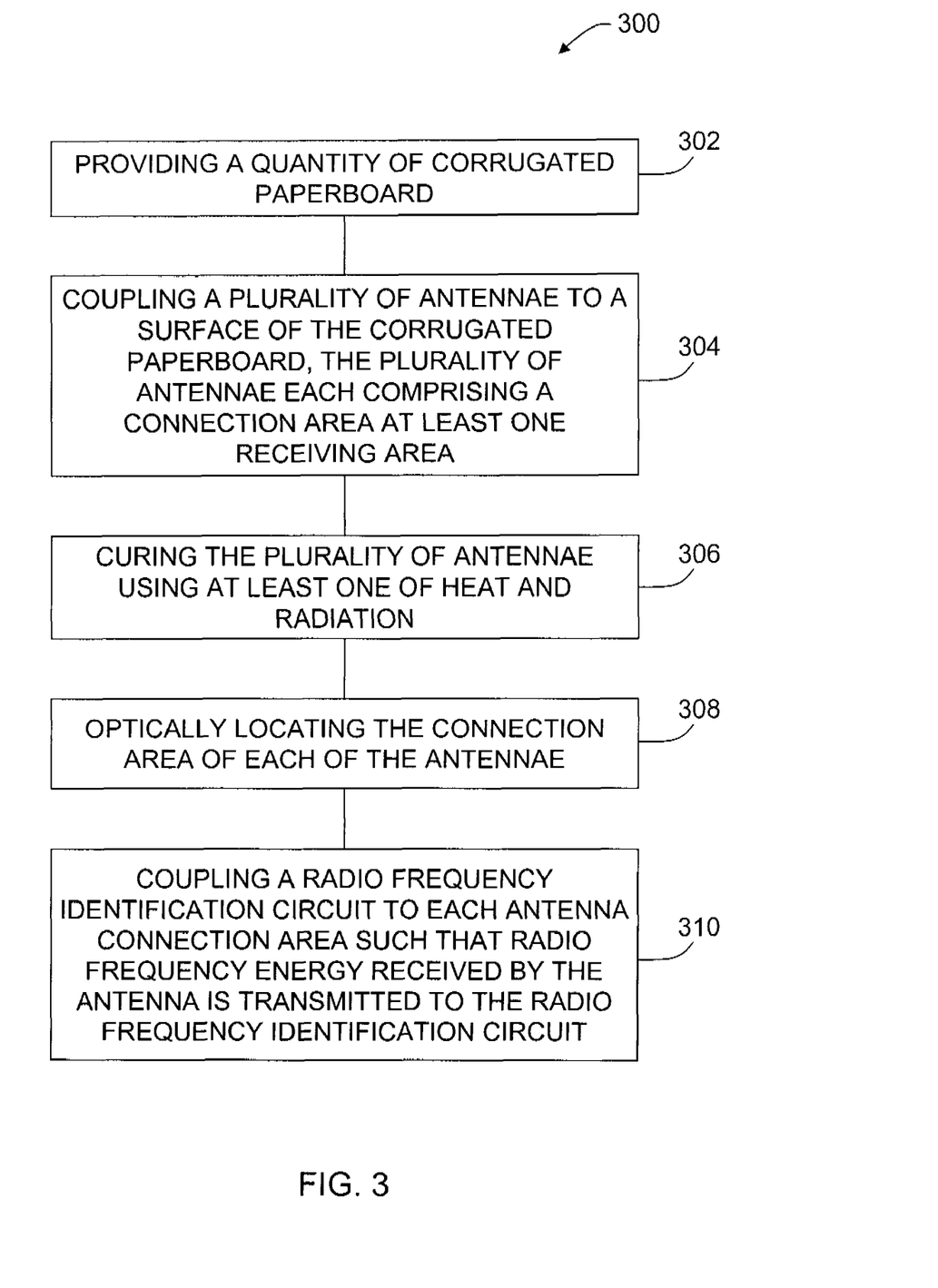
FIG. 3 is a flowchart of an exemplary method of forming a radio frequency identification (RFID) enabled corrugated paperboard.

FIG. 3 is a flowchart of an exemplary method 300 of forming a radio frequency identification (RFID) enabled corrugated paperboard. Method 300 includes providing 302 a quantity of corrugated paperboard. The corrugated paperboard is in the form of a continuous media or is in the form of one or more blanks and may include blanks of various shapes and sizes. A plurality of antennae are coupled 304 to a surface of the corrugated paperboard. The antenna is, for example, printed using a print process or affixed to the surface using a pressure release transfer or thermal transfer process, said plurality of antennae each including a connection area and at least one receiving area. Ink used to print the antennae is electrically conductive, for example, ink that incorporates metals, such as copper, aluminum and/or silver. Inks incorporating organic conducting polymers may also be used. The antenna is printed using a lithographic or flexographic press, but any suitable printing technology can be used, such as rotogravure, rotary screen printing, ink jet printing, and pad printing. One or more conductive layers are printed if a thicker antenna is desired. In an embodiment of the present invention, non-conductive (dielectric) layers are interposed between the conductive layers. The conductive antenna could also be sprayed onto the substrate, using a mask to define the shape of the antenna. Additionally, drop-on-demand inkjet technology and continuous inkjet technology may be used to apply the conductive ink. The plurality of antennae are cured 306 using at least one of heat and radiation. A position of the connection area of each antenna is located 308 for accurately coupling 310 coupling 310 a radio frequency identification circuit to each antenna connection area.

A heat resistant overprint varnish (OPV) is applied over the printed antenna. The OPV, for example, protects the printed antenna from damage during the remaining converting and other operations expected to occur in the Supply Chain. Additionally, the OPV may provide antistatic protection to the strap components using antistatic additives incorporated into the OPV composition. Alternatively, a film patch is used in place of the OPV. When existing process heat sources are unavailable and/or inadequate for curing the printed ink, or other curing methods are required, for example, ultraviolet (UV) or electron beam (EB), additional heat sources, and additional equipment is added to the assembly line.

The connection area of each antenna is optically located 404 using a sensor, for example, an electric eye or a video camera. A controller communicatively coupled to the optical sensor processes the image of the antenna as the linerboard passes proximate the optical sensor to detect features of the antenna that are characteristic to the connection area. The controller then indexes the strap attach device such that the strap or radio frequency identification circuit chip are coupled 310 to the antenna at a predetermined location with respect to the connection area. The strap or radio frequency identification circuit chip is coupled 310 to the antenna connection area such that radio frequency energy received by the antenna is transmitted to the radio frequency identification circuit.

Figure 4:
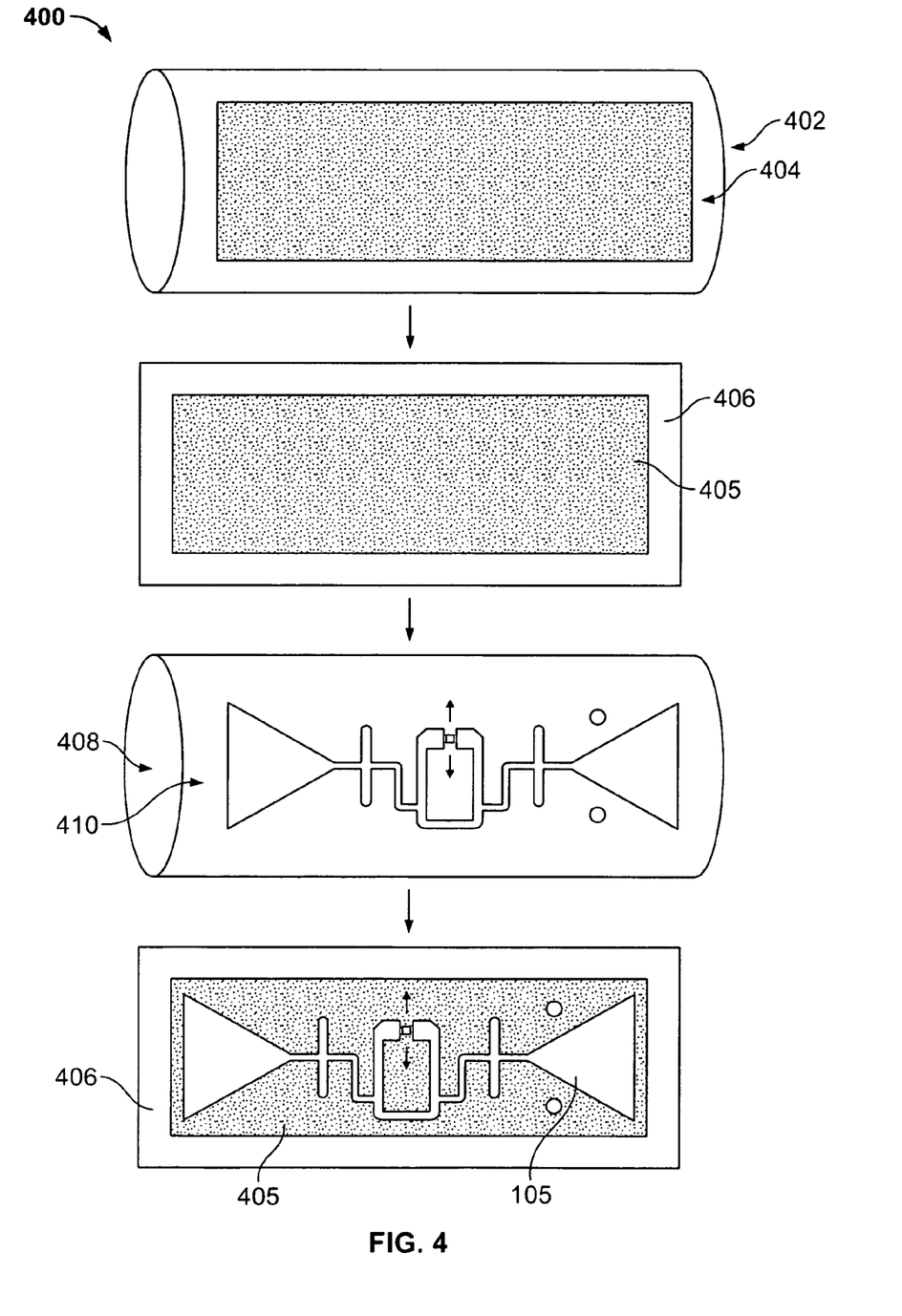
FIG. 4 is a schematic illustration of an exemplary primer patterned print process 400 that may be used to couple antennae 105 to corrugated linerboard 106.

FIG. 4 is a schematic illustration of an exemplary primer patterned print process 400 that may be used to couple antennae 105 to corrugated linerboard 106. A print roller 402 includes a print portion 404 configured to transfer a layer of primer 405 from roller 402 to a section 406 of corrugated linerboard 106. A second print roller 408 includes a print portion 410 configured to transfer a layer of conductive ink from roller 408 to section 406 to form antenna 105 at least partially covering primer layer 405.

Figure 5:
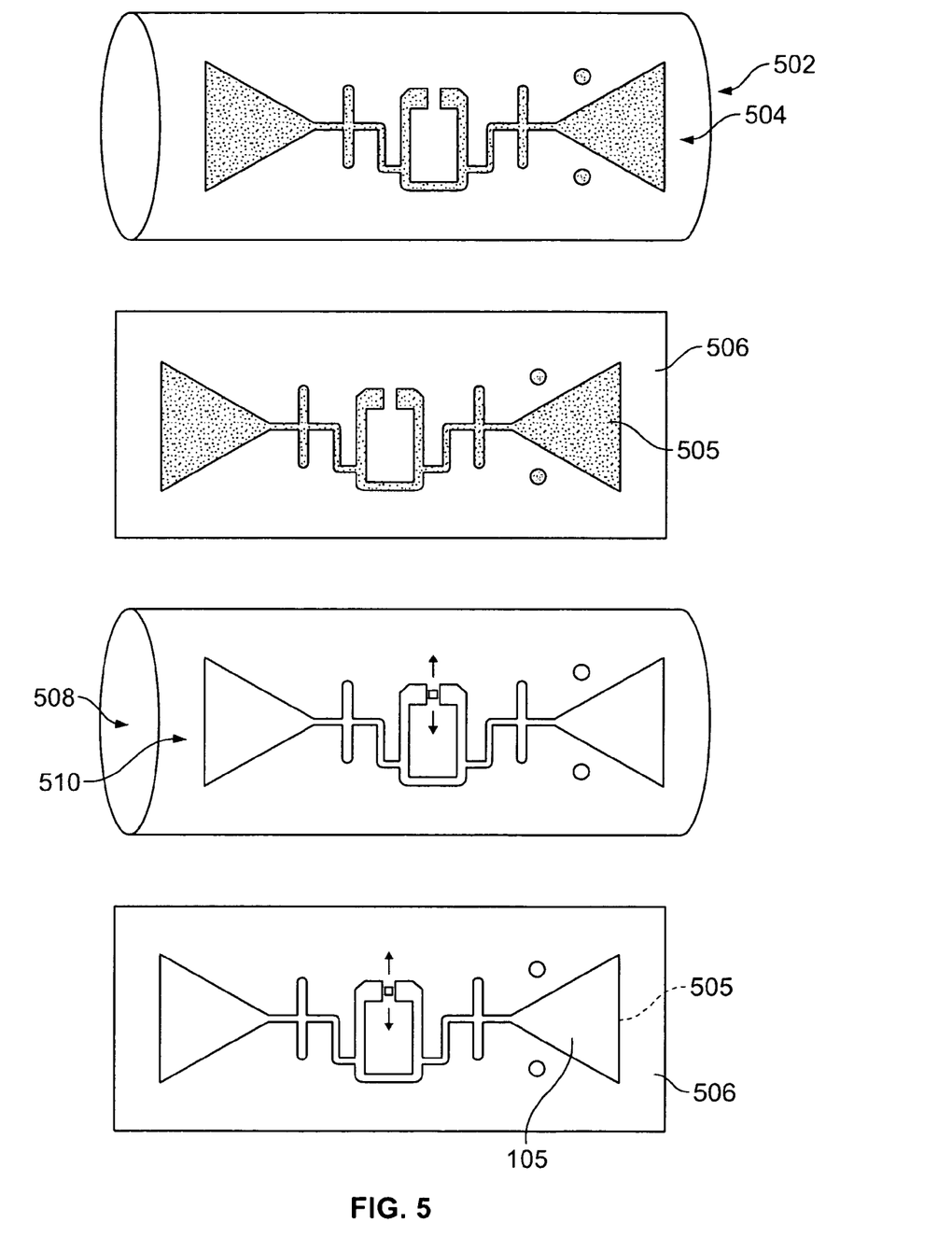
FIG. 5 is a schematic illustration of another exemplary primer patterned print process that may be used to couple an antennae to the corrugated linerboard.

FIG. 5 is a schematic illustration of another exemplary primer patterned print process 500 that may be used to couple antennae 105 to corrugated linerboard 106. A print roller 502 includes a print portion 504 that is substantially the same shape as the desired shape of antenna 105 and is configured to transfer a layer of primer 505 from roller 502 to a section 506 of corrugated linerboard 106. A second print roller 508 includes a print portion 510 configured to transfer a layer of conductive ink from roller 508 to section 506 to form antenna 105 substantially covering primer layer 505.

Figure 6:
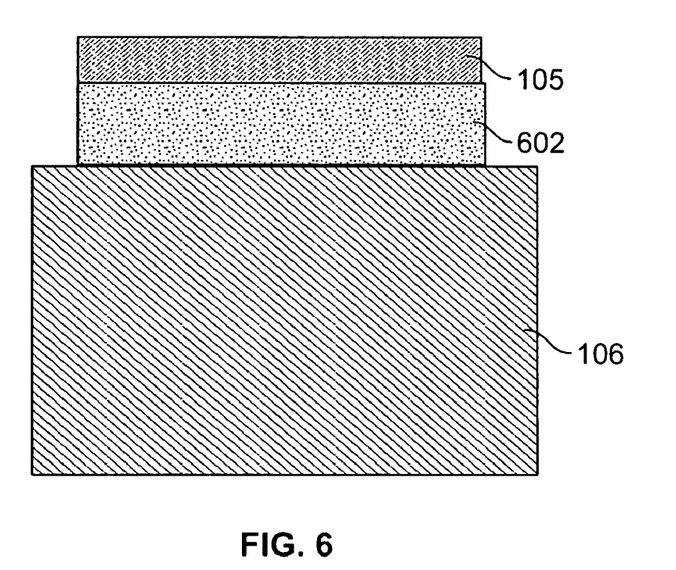
FIG. 6 is a cross-sectional view of an exemplary antenna printed using a primer pattered print process in accordance with an embodiment of the present invention.
Figure 7:
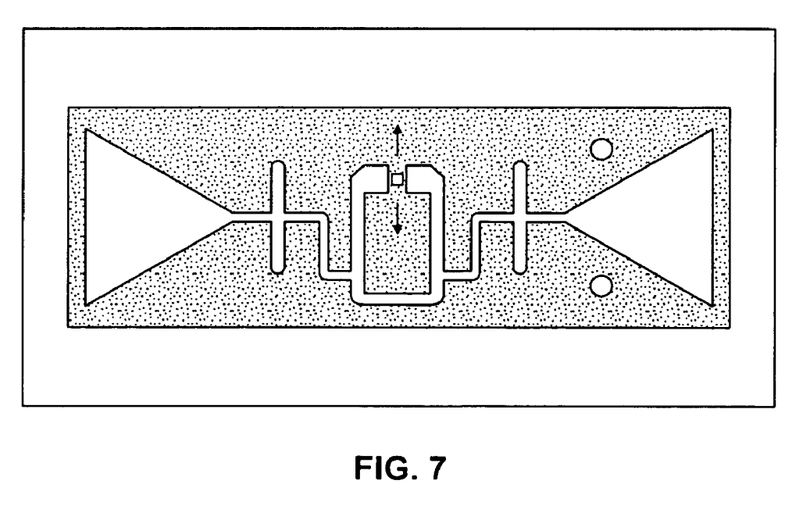
FIG. 7 is a plan view of the antenna shown in FIG. 6.

FIG. 6 is a cross-sectional view of an exemplary antenna printed using a primer pattered print process in accordance with an embodiment of the present invention. FIG. 7 is a plan view of the antenna shown in FIG. 6. A layer 602 of primer is printed on corrugated linerboard 106. Antenna 105 is printed over layer 602 such that antenna 105 at least partially covers layer 602. The primer substantially limits the amount of the conductive ink used to form antenna 105 that bleeds into linerboard 106 maintaining a sharp, relatively well defined shape of antenna 105.

Figure 8:
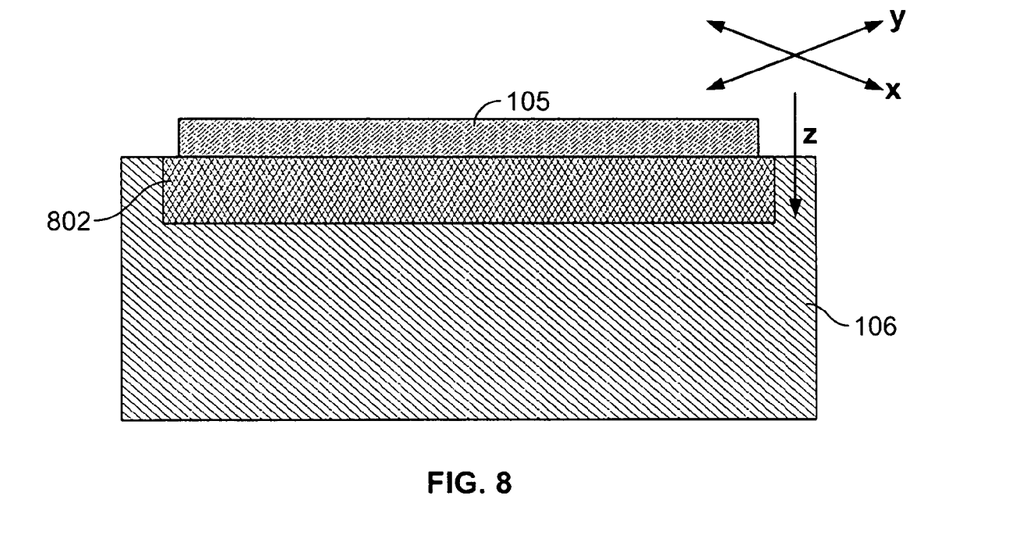
FIG. 8 is a cross-sectional view of an exemplary antenna printed using a known print process.
Figure 9:
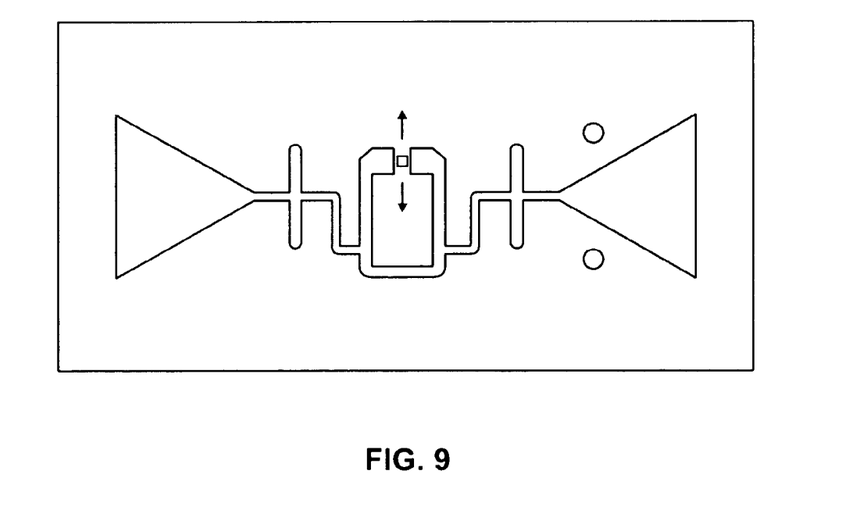
FIG. 9 is a plan view of the antenna shown in FIG. 8.

FIG. 8 is a cross-sectional view of an exemplary antenna printed using a known print process. FIG. 9 is a plan view of the antenna shown in FIG. 8. Antenna 105 is printed directly to corrugated linerboard 106. Because linerboard 106 is at least partially absorbent with respect to the conductive ink used to form antenna 105, at least a portion of the conductive ink bleeds into linerboard 106. A bleed area 802 is formed in linerboard 106 in areas laterally adjacent to antenna 105, for example, in an X and a Y direction along a surface of linerboard 105 and an area below antenna 105 in a Z direction. Bleed area 802 reduces the sharpness of antenna 105 and may adversely impact the performance of antenna 105.

Although the embodiments described herein are discussed with respect to supply chain packaging material, it is understood that the RF-enabled component assembly and processing methodology described herein is not limited to supply chain packaging applications, but may be utilized in other non-packaging applications.

It will be appreciated that the use of first and second or other similar nomenclature for denoting similar items is not intended to specify or imply any particular order unless otherwise stated.

The above-described embodiments of an in-line RFID transponder assembly system provide a cost-effective and reliable means for mass production speed assembly of RF identification enabled packaging material. More specifically, coupling RFID antennas to corrugated paperboard and applying RFID straps or chips to the antennae during fabrication of corrugated containers permits high speed production of supply chain packaging with RFID components applied during fabrication. As a result, the described methods and systems facilitate in-line RFID transponder assembly in a cost-effective and reliable manner.

Exemplary embodiments of in-line RFID transponder assembly methods and apparatus are described above in detail. The in-line RFID transponder assembly components illustrated are not limited to the specific embodiments described herein, but rather, components of each imaging system may be utilized independently and separately from other components described herein. For example, the in-line RFID transponder assembly components described above may also be used in combination with different in-line RFID transponder assembly components. A technical effect of the various embodiments of the systems and methods described herein include facilitating assembly of RF enabled packaging materials at production level speeds.

While the invention has been described in terms of various specific embodiments, those skilled in the art will recognize that the invention can be practiced with modification within the spirit and scope of the claims.

What is claimed is:

1. An apparatus for manufacturing a radio frequency identification (RFID) enabled corrugated paperboard used for forming a container, said container comprising an interior surface defining an enclosed volume and an exterior surface defining an external periphery of the container, said apparatus comprising:
    a corrugated paperboard feed device configured to supply a quantity of corrugated paperboard, the corrugated paperboard used for forming the container;
    an antenna attach device configured to couple an antenna to an outer surface of the finished corrugated paperboard wherein when finished, the corrugated paperboard includes a linerboard and a corrugated medium, said antenna attach device is configured to couple the antenna to the linerboard on a side opposite the corrugated medium in a position that is configured to be the exterior surface of the container;
    a curing device configured to provide curing energy to said antenna to at least one of dry said antenna and facilitate optimizing an electrical conductivity of said antenna; and
    an attach mechanism configured to couple a radio frequency identification circuit to each said antenna on the outer surface of the finished corrugated paperboard in a position on the external surface of the container.

2. An apparatus in accordance with claim 1 wherein said antenna attach device comprises a press configured to couple said antenna to the corrugated paperboard using at least one of a lithographic process, a flexographic process, a rotogravure process, a rotary screen print process, a drop-on-demand ink jet process, a continuous ink jet process, a spray process, a pad printing process, a pressure release substrate process, and a thermal transfer process.

3. An assembly line for manufacturing radio frequency identification enabled corrugated paperboard comprising:
    a supply of corrugated paperboard, the corrugated paperboard used for forming a container comprising an interior surface defining an enclosed volume and an exterior surface defining an external periphery of the container;
    a press configured to couple an antenna to an outer surface of said supply of corrugated paperboard in a position that is configured to be the exterior surface of the container wherein when finished, the corrugated paperboard includes a linerboard and a corrugated medium, said press is configured to couple the antenna to the linerboard on a side opposite the corrugated medium, said antenna comprising a connection area and at least one receiving area;
    a curer configured to provide curing energy to said antenna;
    a sensor configured to locate a connection area of each of said plurality of antennae; and
    an attach mechanism configured to couple a radio frequency identification circuit to each said connection area.

4. A assembly line in accordance with claim 3 wherein said press is configured to print said plurality of antennae using a conductive ink comprising at least one of copper, aluminum, silver, and organic conducting polymers.

5. A assembly line in accordance with claim 3 wherein said press is configured to print said plurality of antennae using at least one of a plurality of layers of conductive ink, and a plurality of conductive ink layers and dielectric layers.

6. A assembly line in accordance with claim 3 wherein said press is configured to couple said plurality of antennae to said surface using at least one of a lithographic process, a flexographic process, a rotogravure process, a rotary screen print process, a drop-on-demand ink jet process, a continuous ink jet process, a spray process, a pad printing process, a pressure release substrate process, and a thermal transfer process.

7. An assembly line in accordance with claim 3 wherein said curer comprises an illuminator configured to direct radiation to cure said antenna.

8. An assembly line in accordance with claim 3 wherein said curer comprises a heating element configured to heat said antenna to cure said antenna.

9. A method of forming a radio frequency identification (RFID) enabled corrugated paperboard, said method comprising:
    providing a quantity of corrugated paperboard, the corrugated paperboard used for forming a container comprising an interior surface defining an enclosed volume and an exterior surface defining an external periphery of the container;
    coupling at least one antennae to an outer surface of the corrugated paperboard in a position that is configured to be the exterior surface of the container wherein when finished, the corrugated paperboard includes a linerboard and a corrugated medium, and wherein coupling comprises coupling the at least one antenna to the linerboard on a side opposite the corrugated medium, the at least one antennae comprising a connection area and at least one receiving area;
    curing the at least one antennae using at least one of heat and radiation;
    optically locating the connection area of the antenna; and
    coupling a radio frequency identification circuit to the antenna connection area such that radio frequency energy received by the antenna is transmitted to the radio frequency identification circuit.

10. A method in accordance with claim 9 wherein coupling at least one antennae to a surface of the corrugated paperboard comprises printing a primer pattern on the surface of the corrugated paperboard.

11. A method in accordance with claim 10 wherein coupling at least one antennae to a surface of the corrugated paperboard comprises printing a conductive ink antenna over at least a potion of the primer pattern.

12. A method in accordance with claim 10 wherein coupling at least one antennae to a surface of the corrugated paperboard comprises printing a conductive ink antenna over substantially all of the primer pattern.

13. A method in accordance with claim 9 wherein coupling at least one antennae to a surface of the corrugated paperboard comprises coupling at least one antennae to a surface of the corrugated paperboard using a conductive ink.

14. A method in accordance with claim 13 wherein coupling at least one antennae to a surface of the corrugated paperboard using a conductive ink comprises printing the at least one antenna using a conductive ink that includes at least one of copper, aluminum, silver, and organic conducting polymers.

15. A method in accordance with claim 14 wherein printing the at least one antenna using a conductive ink comprises printing the at least one antennae using a plurality of layers of conductive ink.

16. A method in accordance with claim 14 wherein printing the at least one antenna using a conductive ink comprises printing the at least one antennae using a plurality of dielectric layers.

17. A method in accordance with claim 9 wherein coupling at least one antenna to a surface of the corrugated paperboard comprises coupling at least one antenna using at least one of a lithographic process, a flexographic process, a rotogravure process, a rotary screen print process, a drop-on-demand ink jet process, a continuous ink jet process, a spray process, a pad printing process, a pressure release substrate process, and a thermal transfer process.

18. A method in accordance with claim 9 wherein curing the at least one antennae comprises illuminating the plurality of antennae using a radiation source.

19. A method in accordance with claim 9 wherein coupling at least one antennae to a surface of the corrugated paperboard comprises pre-printing the plurality of antennae on the corrugated paperboard using an off-line print process.

20. A method in accordance with claim 9 wherein coupling at least one antennae to a surface of the corrugated paperboard comprises applying a heat resistant overprint varnish (OPV) over at least a portion of the antenna such that the connection area is not covered by the OPV.

21. A method in accordance with claim 9 wherein coupling a radio frequency identification circuit to the antenna connection area comprises coupling a radio frequency identification circuit to the antenna connection area downstream from a double facer.

22. A method in accordance with claim 9 wherein coupling a radio frequency identification circuit to each antenna connection area comprises coupling the radio frequency identification circuit directly to a respective antenna connection area, and coupling the radio frequency identification circuit to the antenna connection area using a strap.

* * * * *

UNITED STATES PATENT AND TRADEMARK OFFICE
CERTIFICATE OF CORRECTION

PATENT NO. : 7,651,032 B2
APPLICATION NO. : 11/158704
DATED : January 26, 2010
INVENTOR(S) : Kenneth Shanton It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 326 days.

Signed and Sealed this

Twenty-eighth Day of December, 2010

David J. Kappos
*Director of the United States Patent and Trademark Office*